June 2, 1953   D. J. DENNINGTON, JR   2,640,719
COUPLING
Filed July 25, 1949
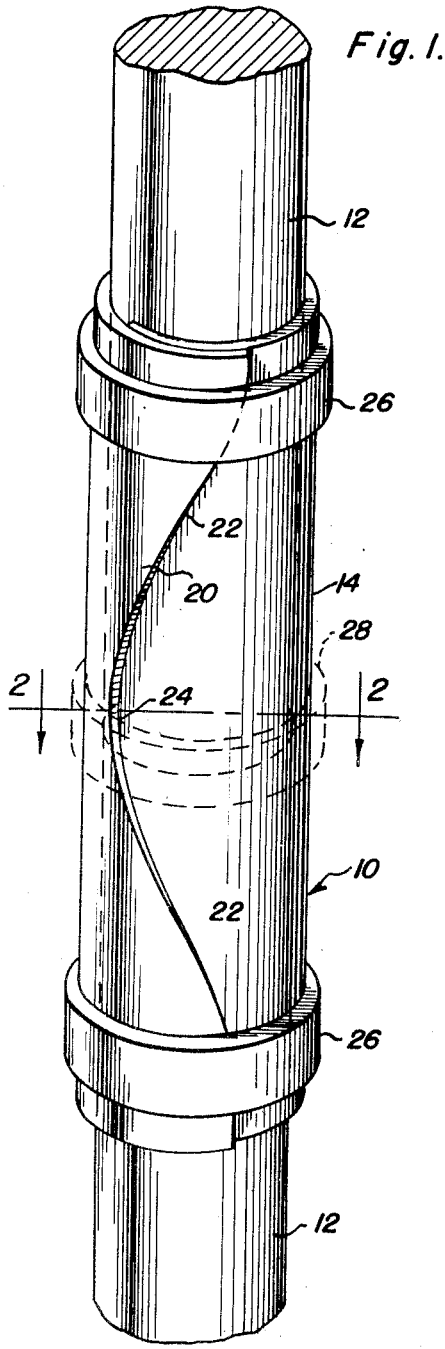
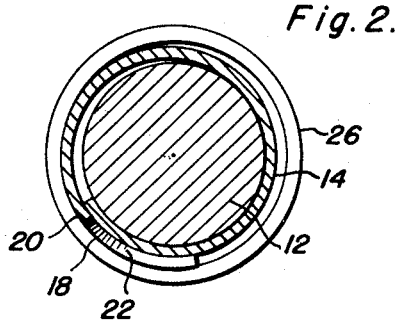
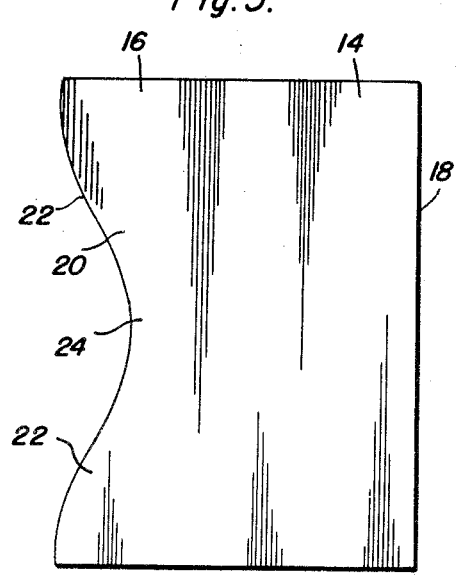
Dan J. Dennington Jr.
INVENTOR.
BY *Clarence A. O'Brien*
*and Harvey B. Jacobson*
Attorneys Patented June 2, 1953

2,640,719

UNITED STATES PATENT OFFICE 2,640,719

COUPLING

Dan J. Dennington, Jr., Texarkana, Tex.

Application July 25, 1949, Serial No. 106,635

4 Claims. (Cl. 287—118)

This invention relates to new and useful improvements in structural refinements in couplings, and the principal object of the invention is to provide a device of the character herein described, such as may be conveniently and effectively employed for connecting together slender, cylindrical or tubular members such as fishing rods, or the like.

This object is achieved by the provision of the instant coupling consisting of an expansible and contractable sleeve having elements provided thereon together with locking members which are slidable longitudinally on the sleeve and engageable with the elements so as to facilitate contraction and expansion of the sleeve.

Some of the advantages of the invention reside in its simplicity of construction, in its convenient and expeditious operation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a perspective view showing a pair of rod sections connected together by the invention;

Figure 2 is a cross sectional view, taken substantially in the plane of the line 2—2 in Figure 1; and, Figure 3 is a developed plan view of the blank of material from which the sleeve of the coupling is formed.

Like characters of reference are employed to designate like parts in the specification and throughout the several views.

Referring now to the accompanying drawings in detail the invention consists of a coupling designated generally by the reference character 10, such as may be conveniently employed for connecting together slender cylindrical or tubular sections 12, as will be presently described.

The coupling 10 embodies in its construction an expansible and contractible sleeve 14 consisting of a sheet of material 16 which is rolled into a substantially tubular formation so as to afford inner and outer overlapped edge portions 18, 20 respectively.

It is to be noted that the outer overlapped edge portion of the sleeve 14 is substantially concave and affords a pair of elements or members 22 comprising edge portions which extend from an intermediate point 24 to the opposite ends of the sleeve, obliquely relative to the longitudinal axis of said sleeve, as is illustrated in Figure 1.

A pair of annular locking members or rings 26 are slidable longitudinally on the sleeve 14, that is, from an intermediate position shown by the dotted line 28 in Figure 1 to the locking positions shown by the full lines in the same figure, these locking members or rings 26 being operatively engageable with the elements 22, as will be presently described.

When the invention is placed in use, the adjacent end portions of the rods 12 are simply inserted in the opposite ends of the sleeve 14 while the locking members 26 are disposed adjacent the center of the sleeve, that is, adjacent the point 24, after which the locking members 26 are slid outwardly in opposite directions to adjacent the opposite ends of the sleeve, during which action the members 26 will engage the elements 22 and cause the sleeve to contract into frictional engagement with the rods 12, whereby the latter will be securely held together by the coupling.

Needless to say, the sections 12 may be separated from the coupling by simply sliding the members 26 toward the center of the sleeve 14, and if desired, the sheet 16 from which the sleeve is formed may consist of resilient material such as spring steel, or the like, so that it is automatically expanded as soon as the members 26 are slid to their unlocked positions.

It is believed that the advantages and use of the invention will be clearly apparent from the foregoing disclosure and accordingly, further description thereof is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A coupling comprising a split, resilient sleeve including lapped longitudinal marginal portions, a member on the overlying portion of the sleeve extending therefrom in opposed relation to the underlying portion of said sleeve, said member including a substantially oblique edge portion, and rigid rings slidable longitudinally on the sleeve and engageable with the member for contracting said sleeve.

2. A coupling comprising a split, resilient sleeve including lapped longitudinal marginal portions, members on the overlying end of the sleeve extending therefrom in opposed relation to the underlying portion of said sleeve, said members comprising substantially oppositely spiraled edge portions extending from an intermediate point on the sleeve to the ends of said sleeve, and rings of a fixed diameter slidable longitudinally on the sleeve and engageable with the members for contracting said sleeve.

3. A coupling comprising a split, resilient sleeve including lapped longitudinal marginal portions, integral members on the overlying portion of the sleeve extending circumferentially therefrom in opposed relation to the underlying portion of said sleeve, said members including oppositely spiraled edge portions extending to the ends of the sleeve from an intermediate point thereon, and rigid rings slidable longitudinally on the sleeve and engageable with said members for contracting said sleeve.

4. A coupling comprising a longitudinally split, resilient sleeve including lapped marginal portions, the overlying marginal portion of said sleeve including a substantially longitudinally concaved free edge for progressively increasing the cross sectional area of the sleeve from its intermediate portion toward the ends thereof, and rings slidable on the sleeve and engaged with said edge for contracting said sleeve.

DAN J. DENNINGTON, Jr.

References Cited in the file of this patent

UNITED STATES PATENTS

| Number | Name | Date |
|---|---|---|
| 35,355 | Vosburg | May 20, 1862 |
| 110,590 | Reinshagen | Dec. 27, 1870 |
| 145,950 | Jeralds | Dec. 30, 1873 |
| 327,479 | Spalding | Sept. 29, 1885 |
| 445,365 | Bergmann | Jan. 27, 1891 |
| 545,911 | Reilly | Sept. 10, 1895 |
| 719,817 | Kunze | Feb. 3, 1903 |
| 767,893 | Jewell | Aug. 16, 1904 |
| 858,439 | Cantwell | July 2, 1907 |
| 1,545,197 | Prince | July 7, 1925 |
| 2,233,086 | Shreffler | Feb. 25, 1941 |
| 2,367,191 | Bailey | Jan. 16, 1945 |